US010747656B2

(12) United States Patent
Yang et al.

(10) Patent No.: US 10,747,656 B2
(45) Date of Patent: Aug. 18, 2020

(54) SYSTEMS AND METHODS FOR MOBILE AUTOMATION TESTING BY EMULATING HUMAN BEHAVIORS

(71) Applicant: FMR LLC, Boston, MA (US)

(72) Inventors: Ke Yang, Dalian (CN); Hongbing Gu, Dalian (CN); Yanyu Xu, Dalian (CN); Pengrui Sun, Dalian (CN)

(73) Assignee: FMR LLC, Boston, MA (US)

( * ) Notice: Subject to any disclaimer, the term of this patent is extended or adjusted under 35 U.S.C. 154(b) by 0 days.

(21) Appl. No.: 16/200,827

(22) Filed: Nov. 27, 2018

(65) Prior Publication Data

US 2020/0167270 A1    May 28, 2020

(51) Int. Cl.
*G06F 11/00* (2006.01)
*G06F 11/36* (2006.01)

(52) U.S. Cl.
CPC ...... *G06F 11/3688* (2013.01); *G06F 11/3664* (2013.01); *G06F 11/3684* (2013.01)

(58) Field of Classification Search
CPC ............. G06F 11/3664; G06F 11/3668; G06F 11/3688; G06F 11/3692; G06F 11/3696
See application file for complete search history.

(56) References Cited

U.S. PATENT DOCUMENTS

| | | | |
|---|---|---|---|
| 5,513,315 A * | 4/1996 | Tierney | G06F 11/3688 714/10 |
| 5,634,002 A * | 5/1997 | Polk | G06F 11/3688 714/38.14 |
| 8,079,022 B2 * | 12/2011 | Seneski | G06F 11/3664 717/135 |
| 8,924,192 B1 * | 12/2014 | Poulin | G06F 11/3457 703/13 |
| 8,978,014 B1 * | 3/2015 | Larsen | G06F 11/3668 717/125 |
| 9,154,611 B1 * | 10/2015 | Jackson | H04W 4/029 |

(Continued)

OTHER PUBLICATIONS

Yang et al., "A Grey-Box Approach for Automated GUI-Model Generation of Mobile Applications", 2013, FASE 2013, LNCS 7793, pp. 250-265 (Year: 2013).*

(Continued)

*Primary Examiner* — Michael Maskulinski
(74) *Attorney, Agent, or Firm* — Proskauer Rose LLP

(57) ABSTRACT

A computerized method of testing a mobile application stored on a mobile test device includes executing, by a computing device, a test script stored in memory of the computing device; running, by the computing device, according to the test script, a human behavior simulation module; retrieving, by the computing device, an event list stored in a server, the event list including one or more electronic human behavior simulations; receiving, by the computing device an electronic human behavior simulation from the event list; providing, by the computing device, selected data of the electronic human behavior simulation to memory of the server for recordation; executing, by the computing device, the electronic human behavior simulation on a mobile test device in electronic communication with the computing device; and executing, by the computing device, according to the test script, a test case stored in memory of the computing device on the mobile test device.

27 Claims, 8 Drawing Sheets

(56) References Cited

U.S. PATENT DOCUMENTS

| | | | |
|---|---|---|---|
| 9,283,672 B1 | 3/2016 | Matthews et al. | |
| 9,582,391 B2 | 2/2017 | Diperna et al. | |
| 9,665,473 B2 | 5/2017 | Bs et al. | |
| 9,718,196 B2 | 8/2017 | Matthews et al. | |
| 2011/0310041 A1* | 12/2011 | Williams | G06F 11/3672 |
| | | | 345/173 |
| 2012/0226940 A1* | 9/2012 | Lin | G06F 11/263 |
| | | | 714/26 |
| 2012/0317555 A1* | 12/2012 | Aluru | G06F 11/3664 |
| | | | 717/134 |
| 2013/0326467 A1* | 12/2013 | Nair | G06F 11/3664 |
| | | | 717/101 |
| 2014/0282425 A1 | 9/2014 | Zhao et al. | |
| 2016/0187876 A1 | 6/2016 | Diperna et al. | |
| 2017/0052527 A1* | 2/2017 | Dougherty | G05B 19/41875 |
| 2017/0262130 A1* | 9/2017 | Lloyd | G06F 11/3688 |
| 2018/0173617 A1* | 6/2018 | Tian | G06F 9/451 |
| 2018/0210814 A1* | 7/2018 | Mevorach | G06F 11/3644 |
| 2018/0329813 A1* | 11/2018 | Hamid | G06F 11/3696 |
| 2019/0004932 A1* | 1/2019 | Misra | G06F 11/3688 |
| 2019/0079849 A1* | 3/2019 | Korn | G06Q 10/04 |
| 2019/0188117 A1* | 6/2019 | Liu | G06F 11/3688 |
| 2019/0227917 A1* | 7/2019 | Henry | G06F 11/3684 |

OTHER PUBLICATIONS

Hesenius et al., "Automating UI Tests for Mobile Applications with Formal Gesture Descriptions", MobileHCI 2014, Sep. 23-26, 2014, pp. 213-222 (Year: 2014).*

Gao et al., "Mobile Application Testing: A Tutorial", IEEE Computer Society, 2014, pp. 46-55 (Year: 2014).*

Mao et al., "Robotic Testing of Mobile Apps for Truly Black-Box Automation", IEEE Software, Mar./Apr. 2017, pp. 11-16 (Year: 2017).*

Banks et al., Handbook of Simulation, 1998, John Wiley & Sons, Inc. (Year: 1998).*

* cited by examiner

400

405 Executing, by a computing device, a test script stored in memory of the computing device

410 Calling, by the computing device, according to the test script, a human behavior simulation module stored in memory of the computing device.

415 Retrieving, by the computing device, via the human behavior simulation module, an event list stored in memory of a server, the server in electronic communication with the computing device, the event list including one or more electronic human behavior simulations.

420 Receiving, by the computing device, via the human behavior simulation module, an electronic human behavior simulation from the event list.

425 Providing, by the computing device, via the human behavior simulation module, selected data of the electronic human behavior simulation to memory of the server for recordation.

430 Executing, by the computing device, via the human behavior simluation module, the electronic human behavior simulation on a mobile test device in electronic communication with the computing device.

435 Executing, by the computing device, according to the test script, a test case stored in memory of the computing device on the mobile test device.

FIG. 4

SYSTEMS AND METHODS FOR MOBILE AUTOMATION TESTING BY EMULATING HUMAN BEHAVIORS

TECHNICAL FIELD

This application relates generally to systems, methods and apparatuses, including computer programs, for testing mobile applications. More specifically, this application relates to using simulated human behaviors during mobile application testing to identify, track and resolve technical issues occurring during mobile application usage.

BACKGROUND

Mobile automation testing is currently used to identify and resolve bugs and other technical issues with mobile applications, thereby ensuring that mobile applications achieve high performance and stability. Traditional mobile automation testing includes testing mobile application features or functions one at a time, e.g., by writing one or more test cases. However, even if all test cases are passed, it is difficult to ensure that the mobile application contains no bugs or coding errors, because the test cases are unable to take human behaviors into account. For example, random events such as interruptions caused by notifications received on a phone, incoming calls, and switching applications by the user can give rise to additional bugs and errors within the application that are outside the scope of traditional mobile automation testing. Such real-life randomness injects significant uncertainty into mobile application testing.

To compound these problems, once an error is discovered in a real usage scenario, it is very hard to reproduce the error, particularly if it is caused by a random event during testing. Examples of such scenarios include: (1) a phone call is received while the application is running; after the user answers the phone, the application's status is corrupted, or the application fails to respond; (2) a notification pops up while the application is running; after the user reads the message by clicking the notification, the application crashes; (3) a new application is started using the test application; after the user closes the new application, the test application does not display correctly; (4) a mobile device is moved from one position to another randomly, e.g., while a user gestures in conversation, so the application switches from landscape display mode to portrait display mode; these random movements give rise to bugs; (5) a network to which the mobile device is connected switches one or off randomly, e.g., loses an internet connection or switches WiFi connections; these random network status changes give rise to bugs.

SUMMARY

Accordingly, the invention provides systems, methods and apparatuses to test mobile applications by emulating human or "human-like" behaviors in simulated scenarios that better approximate or mimic real-life scenarios. A framework is designed that can be integrated with current mobile automation test environments and can generate random events (e.g., switching applications, receiving push notifications, making phone calls, moving or rotating the device, etc.) while executing normal test scripts on the mobile testing device to emulate human-like behaviors. The invention enables developers to reproduce defects, which in turn allows them to gain a better handle on ways to fix the defects. This setup stands in contrast to normal mobile application testing, in which a defect is difficult to reproduce once it is discovered and/or tested only once. Thus, the invention enables high-quality testing, tracking and resolution of a variety of previously undiscovered and/or unresolved technical issues during mobile automation testing.

In one aspect, the invention features a computerized method of testing a mobile application stored in memory of a mobile test device. The computerized method includes executing, by a computing device, a test script stored in memory of the computing device. The computerized method also includes running, by the computing device, according to the test script, a human behavior simulation module stored in memory of the computing device. The computerized method also includes retrieving, by the computing device, via the human behavior simulation module, an event list stored in memory of a server. The server is in electronic communication with the computing device. The event list includes one or more electronic human behavior simulations. The computerized method also includes receiving, by the computing device, via the human behavior simulation module, an electronic human behavior simulation from the event list. The computerized method also includes providing, by the computing device, via the human behavior simulation module, selected data of the electronic human behavior simulation to memory of the server for recordation. The computerized method also includes executing, by the computing device, via the human behavior simulation module, the electronic human behavior simulation on a mobile test device in electronic communication with the computing device. The computerized method also includes executing, by the computing device, according to the test script, a test case stored in memory of the computing device on the mobile test device.

In some embodiments, the electronic human behavior simulation is received at a random time. In some embodiments, the electronic human behavior simulation is generated based on a record of a previously run electronic human behavior simulation. In some embodiments, the record is stored in memory of the server and including at least one parameter of the previously run electronic human behavior simulation. In some embodiments, executing the electronic human behavior simulation and executing the test case occur simultaneously or near-simultaneously. In some embodiments, the electronic human behavior simulation simulates a human making a phone call. In some embodiments, the electronic human behavior simulation simulates a human receiving a phone call. In some embodiments, the electronic human behavior simulation simulates a human rotating or translating a mobile device. In some embodiments, the electronic human behavior simulation simulates a human switching between mobile applications. In some embodiments, the electronic human behavior simulation simulates a human rotating a mobile device such that a display screen of the mobile device changes orientation. In some embodiments, the electronic human behavior simulation simulates changing a network connectivity status of a mobile device. In some embodiments, the electronic human behavior simulation simulates receiving a push notification on a mobile device.

In some embodiments, the method includes logging, by the computing device, via a log module in communication with the human behavior simulation module, the selected data of the electronic human behavior simulation in a database of the server. In some embodiments, executing the electronic human behavior simulation includes providing, via the human behavior simulation module, the electronic human behavior simulation to an event execution module. In some embodiments, the event execution module is at least one of a command execution module, (e.g., including Web-DriverAgent/UIAutomator), a notification module, or an internet-of-things module. In some embodiments, executing the electronic human behavior simulation includes sending a command to mobile device test equipment in electronic communication with the computing device.

In some embodiments, the mobile device test equipment is configured to interact with the mobile test device. In some embodiments, the electronic human behavior simulation includes a physical movement implemented by auxiliary hardware in electronic communication with the mobile device test equipment. In some embodiments, the mobile device test equipment includes a mobile device test fixture. In some embodiments, the mobile device test fixture is configured to rotate or translate the mobile test device or to interact with a screen of the mobile test device. In some embodiments, the mobile device test equipment includes an auxiliary mobile phone used to make a phone call to the mobile test device. In some embodiments, the electronic human behavior simulation includes providing a push notification to the mobile test device via a cloud messaging service in electronic communication with the mobile test device. In some embodiments, the test script includes instructions specifying a time at which to run the human behavior simulation module.

In another aspect, the invention features a system for testing a mobile application stored in memory of a mobile test device. The system includes a computing device configured to (i) execute a test script stored in memory of the computing device; (ii) run, according to the test script, a human behavior simulation module stored in memory of the computing device; (iii) retrieve, via the human behavior simulation module, an event list including one or more electronic human behavior simulations; (iv) receive, via the human behavior simulation module, an electronic human behavior simulation from the event list; (v) provide, via the human behavior simulation module, selected data of the electronic human behavior simulation to memory of the server for recording; (vi) execute, via the human behavior simulation module, the electronic human behavior simulation on a mobile test device in electronic communication with the computing device; and (vii) execute, according to the test script, a test case stored in memory of the computing device on the mobile test device. The system also includes a server in electronic communication with the computing device. The system also includes a mobile test device in communication with the computing device, the mobile test device configured to host the mobile application and execute mobile automation test scripts.

In some embodiments, the system further includes a cloud messaging service in electronic communication with the computing device. In some embodiments, the cloud messaging service is configured to push notifications to the mobile test device. In some embodiments, the system further includes mobile device test equipment in electronic communication with the computing device. In some embodiments, the mobile device test equipment includes at least one of a mobile device test fixture and an auxiliary mobile phone. In some embodiments, the human behavior simulation module includes a human behavior generator, a log module, and at least one of a command execution module, a notification module, or an internet-of-things module. In some embodiments, a command execution module is used to execute scripts on mobile devices. In some embodiments, WebDriverAgent and UIAutomator are two frameworks of command execution modules. In some embodiments, Web-DriverAgent is used to execute scripts on iOS devices. In some embodiments, UIAutomator is used to execute scripts on Android devices.

By virtue of the above systems, methods, apparatuses, and those further described below, the invention provides a novel solution to enhance mobile automation testing. A framework is designed and used to generate human-like behaviors while running test scripts to simulate mobile application usage in real scenarios, such as making a phone call, receiving a push notification, or switching applications. In addition, when a bug is tested out, the system can reproduce the bug for developers to fix it.

BRIEF DESCRIPTION OF THE DRAWINGS

The advantages of the invention described above, together with further advantages, may be better understood by referring to the following description taken in conjunction with the accompanying drawings. The drawings are not necessarily to scale; emphasis is instead generally placed upon illustrating the principles of the invention.

FIG. 4 is a flow chart showing a computerized method of testing a mobile application, according to an illustrative embodiment of the invention.

DETAILED DESCRIPTION

Figure 1:
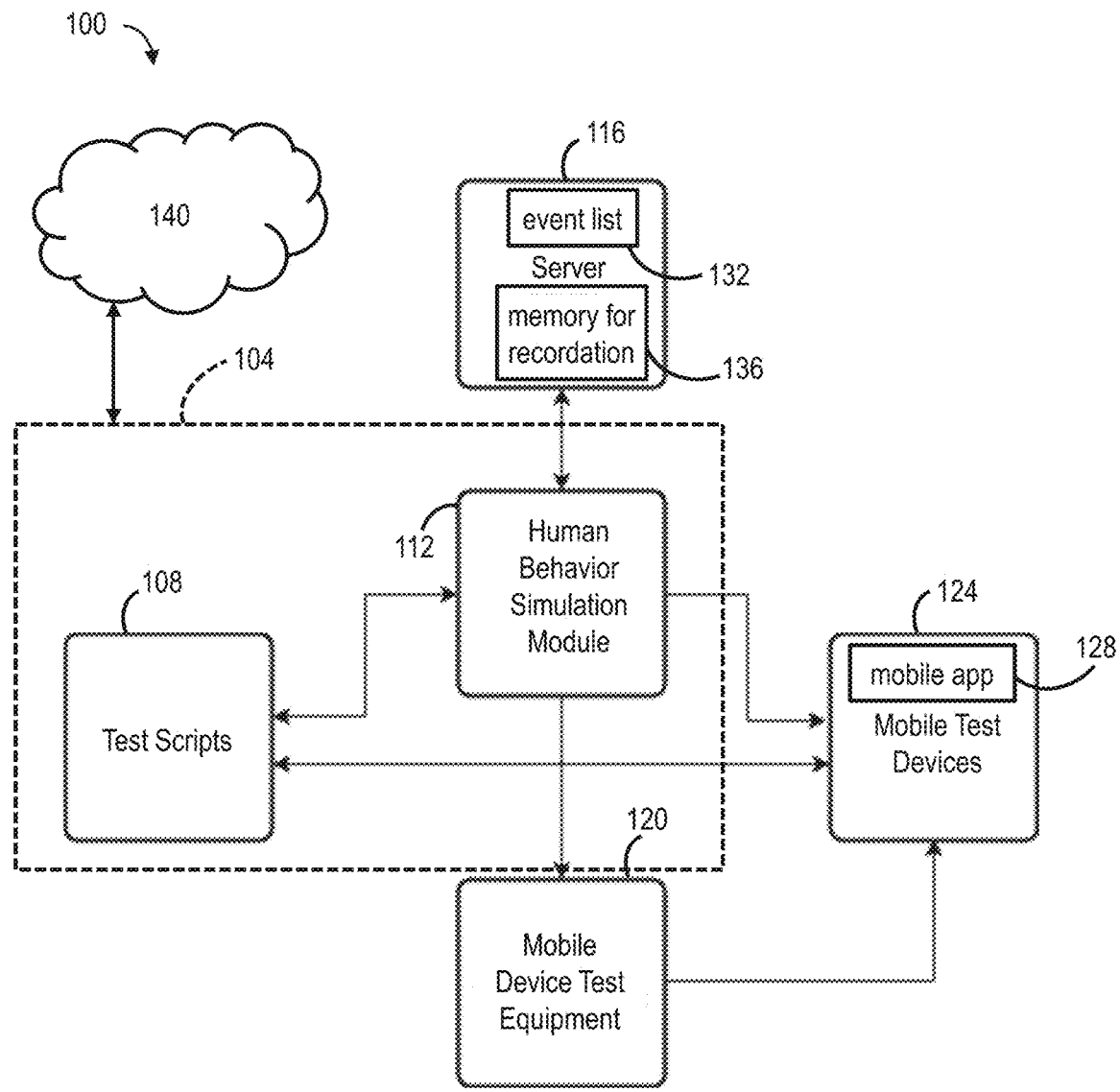
FIG. 1 is a schematic diagram of a high-level system architecture for a mobile application test system, according to an illustrative embodiment of the invention.

FIG. 1 is a schematic diagram of a high-level system architecture for a mobile application test system 100, according to an illustrative embodiment of the invention. The system 100 includes four components that work together to test one or more mobile applications under conditions that simulate or approximate real-world usage: (1) a computing device 104, having stored in memory (i) one or more test scripts 108 and (ii) a human behavior simulation module 112; (2) a server 116 in electronic communication with the computing device 104; (3) mobile device test equipment 120 in electronic communication with the computing device 104; and (4) one or more mobile test devices 124 in electronic communication with the computing device 104, the one or more mobile test devices 124 having one or more installed mobile applications 128.

The human behavior simulation module 112 can provide at least three functions: (1) it interacts with the mobile test devices 124 in a human-like manner, e.g., by sending notifications, making phone calls, or switching applications or network connections; (2) it sends commands to the mobile device test equipment 120 to drive the mobile device test equipment 120 or move the mobile test devices 124; (3) it records and/or retrieves tested behaviors to and/or from the server 116. The server 116 then stores human-like behaviors and test logs, and human-like behaviors can be added, updated, deleted, and/or stored in the database. The mobile device test equipment 120, on which mobile test devices 124 having installed mobile applications 128 are fixed for testing, can receive commands from the human behavior simulation module 112 (e.g., a human behavior generator framework) to actuate certain movements of the mobile test devices 124, such as shifting and rotating. When a bug is tested, records can be retrieved from the server 116 and the test scripts can be replayed to show how the bug is generated.

The server 116 can include an event list 132, which can store one or more electronic human behavior simulations, and memory 136 for recordation (e.g., of testing events). The one or more test scripts 104 can be used to test features and/or functions of the one or more mobile applications 128 using one or more test cases. They can also call exposed methods from the human behavior simulation module 112 (e.g., automatically or randomly) in a manner that does not require testers to modify their existing test scripts to indicate when they should call random human-like events. In some embodiments, the system includes an "on/off" feature that allows the same test scripts to be used for their traditional automation testing (e.g., in system "off" mode) or by simulating a real-life usage scenario of mobile apps (e.g., in system "on" mode). In some embodiments, the system includes a cloud messaging service 140 in electronic communication with the computing device, the cloud messaging service 140 configured to push notifications to the one or more mobile test devices 124.

Using the system 100, the mobile application 128 can be tested according to a computerized method. The computing device 104 executes a test script 108 stored in memory of the computing device 104. The computing device 104 calls, according to the test script 108, the human behavior simulation module 112 stored in memory of the computing device 104. The computing device 104 retrieves, via the human behavior simulation module 112, the event list 132 stored in memory of the server 116, the event list 132 including one or more electronic human behavior simulations. The computing device 104 receives, via the human behavior simulation module 112, an electronic human behavior simulation from the event list 132. The computing device 104 provides, via the human behavior simulation module 112, selected data of the electronic human behavior simulation to memory of the server 104 for recordation (e.g., in memory 136). The computing device 104 executes, via the human behavior simulation module 112, the electronic human behavior simulation on the mobile test device 124. The computing device 104 executes, according to the test script 108, a test case stored in memory of the computing device 104 on the mobile test device 124.

The electronic human behavior simulation can be received by the mobile test device 124 at a random time and/or generated based on a record of a previously run electronic human behavior simulation, with the record stored in memory of the server 116 and including at least one parameter of the previously run electronic human behavior simulation. Executing the electronic human behavior simulation and executing the test case can occur simultaneously or near-simultaneously. The electronic human behavior simulation can simulate many events, such as a human making a phone call, a human receiving a phone call, a human rotating and/or translating a mobile device, a human switching between mobile applications, a human rotating a mobile device such that a display screen of the mobile device changes orientation, the mobile device changing a network connectivity status, or the mobile device receiving a push notification. The method can also include logging, by computing device 104, via a log module in communication with the human behavior simulation module, the selected data of the electronic human behavior simulation in a database of the server 116.

The electronic human behavior simulation can include a physical movement implemented by auxiliary hardware in electronic communication with the mobile device test equipment 120. The mobile device test equipment 120 can include a mobile device test fixture, the mobile device test fixture configured to rotate or translate the mobile test device 124 or to interact with a screen of the mobile test device 124. The mobile device test equipment 120 can include an auxiliary mobile phone used to make a phone call to the mobile test device. The electronic human behavior simulation can include providing a push notification to the mobile test device via a cloud messaging service 140 in electronic communication with the mobile test device 124. The test script can include instructions specifying a time at which to run the human behavior simulation module.

Figure 2:
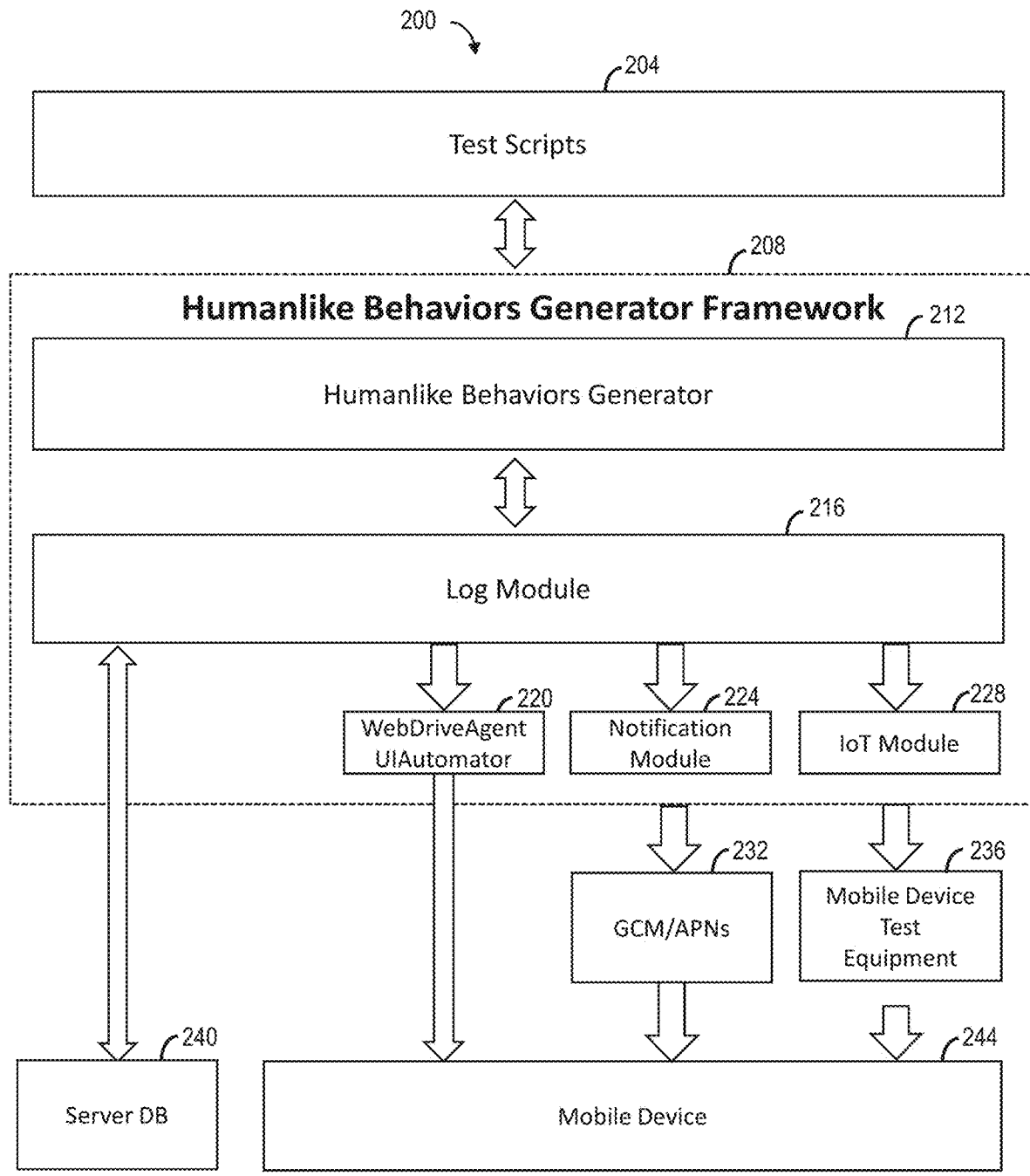
FIG. 2 is a schematic diagram of a detailed system architecture for a mobile application test system, according to an illustrative embodiment of the invention.

FIG. 2 is a schematic diagram of a detailed system architecture for a mobile application test system 200, according to an illustrative embodiment of the invention. The system 200 includes test scripts 204 (e.g., the test scripts 108 shown and described above in connection with FIG. 1) and a human behavior simulation module (or "humanlike behaviors generator framework") 208 (e.g., the human behavior simulation module 112 shown and described above in connection with FIG. 1) having a human-like behavior generator 212, a log module 216, a WebDriverAgent/UIAutomator 220, a notification module 224, and an Internet of Things module 228. The system 200 also includes GCM/APNs 232 and mobile device test equipment 236 (e.g., the mobile device test equipment 120 shown and described above in connection with FIG. 1) in communication with the human behavior simulation module 208. The system 200 also includes a server 240 (e.g., the server 116 shown and described above in connection with FIG. 1) and a mobile device 244 (e.g., the one or more mobile test devices 124 shown and described above in connection with FIG. 1) in communication with the human behavior simulation module 208.

While the test scripts 204 are running individual test cases, the system 200 calls the human behaviors simulation module 208 to generate random events, such as making a phone call, switching applications and/or rotating an application screen. The human behaviors generator 212 will generate these events and log all events into the server 240 via the Log Module 216. For some events, such as switching applications or switching on and/or off of certain networks, the WebDriverAgent/UIAutomator 220 will run these commands (e.g., in iPhones or Android phones). For push notification events, the notification module 224 pushes the message to the mobile test device 244 via the GCM/APNs 232. For events including physical motion of the mobile test device 244, an action is sent via the Internet of Things module 228 to the Mobile Device Test Equipment 236, and then the Mobile Device Test Equipment 236 shifts or rotates the mobile test device 244 physically.

FIGS. 3A-3E are schematic flow diagrams of procedures for testing mobile applications, according to illustrative embodiments of the invention. Human-like behaviors can be classified into two types, based on whether the execution of behavior requires auxiliary equipment: non-movement events and movement events. Non-movement behavior is able to be executed without any auxiliary equipment (e.g., receiving push notifications, making phone calls, and/or switching network connections on or off). Movement behavior is executed with auxiliary equipment (e.g., shifting and/or rotating mobile devices).

Figure 3A:
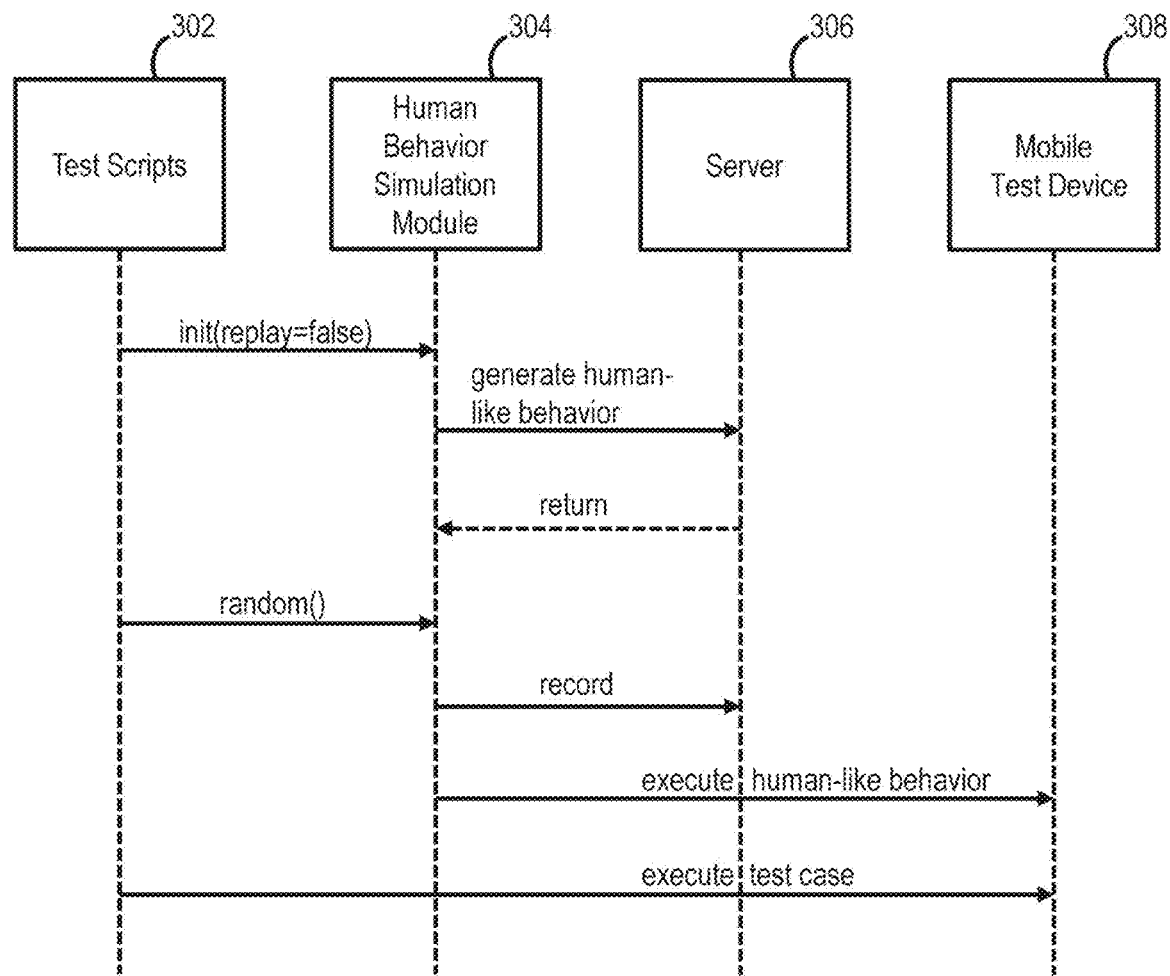
FIGS. 3A-3E are schematic flow diagrams of procedures for testing mobile applications, according to illustrative embodiments of the invention.

FIG. 3A shows a schematic flow diagram of a non-movement human-like behavior test procedure used during a mobile application test, according to an illustrative embodiment of the invention. One or more test scripts 302 call an initialization method of a human behavior simulation module 304 (e.g., as shown and described above). Since this procedure is used to test features and/or functions of mobile application, rather than to replay bugs, the parameter "replay" of the initialization method is set to "false." Then, the humanlike behaviors simulation module 304 retrieves an event list from the server 306. Then, the test scripts 302 choose one of the events from the event list randomly and the human behavior simulation module 304 records or logs the selected event into the server 306 and executes the selected event on the mobile test device 308. During the execution of selected event, the test scripts 302 execute test cases on the mobile test device 308. All pre-defined behaviors are saved in the server 306, and behaviors can be added to, updated on, and/or deleted from the server 306. If a bug has been tested out, the behavior can be retrieved and replayed. Then, the human behavior simulation module 304 executes the event selected from previous step on the mobile test device 308. Then, the test scripts 302 execute test cases at the same time on the mobile test device 308.

Figure 3B:
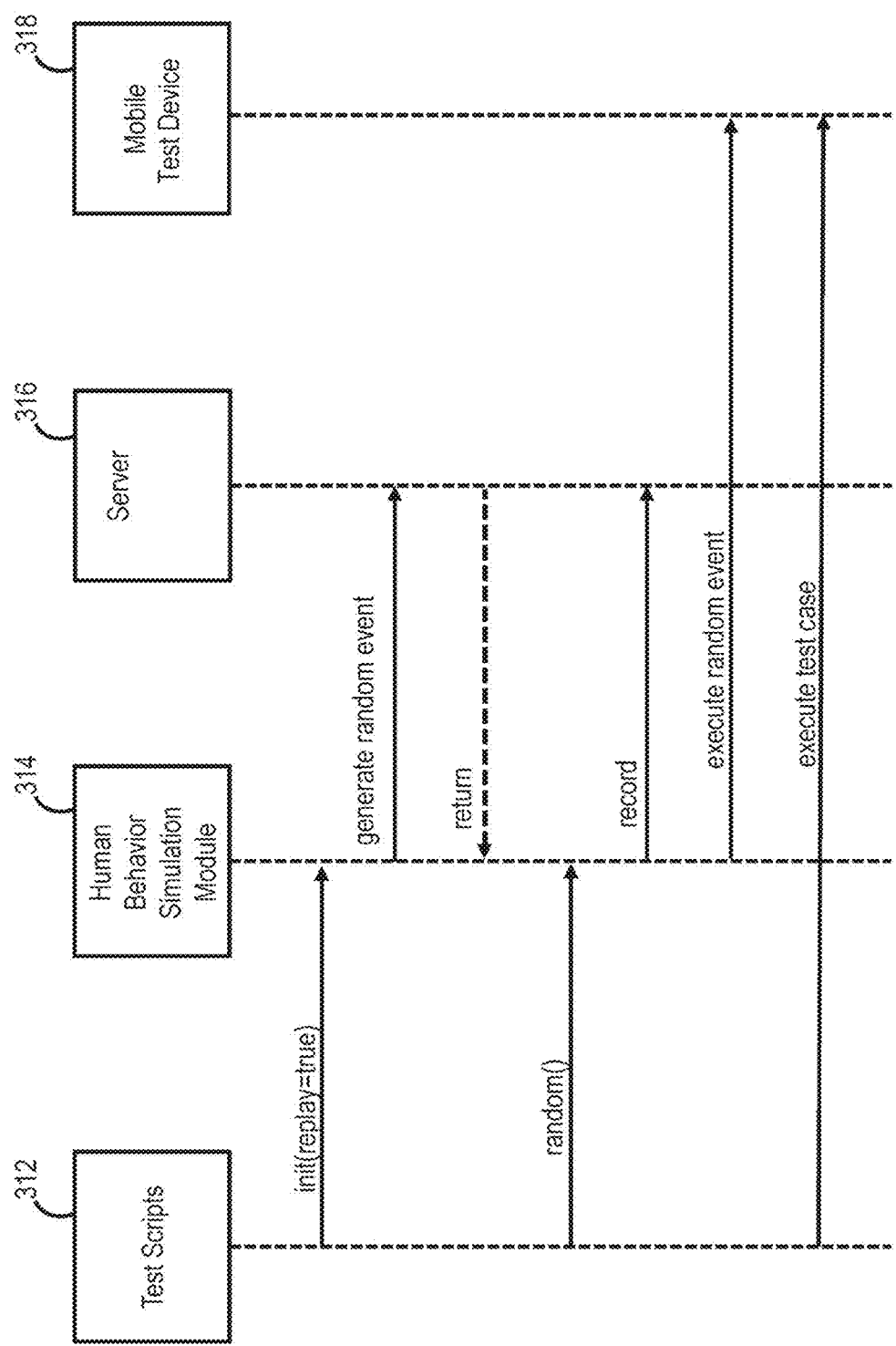

FIG. 3B shows a schematic flow diagram of a non-movement humanlike behavior replay procedure, according to an illustrative embodiment of the invention. When a bug is tested out during the execution of a humanlike behavior, the behavior is saved before it will be retrieved, and then test scripts will run the test cases again to re-generate the bug. Test scripts 312 call an initialization method of the human behavior simulation module 314. As this procedure is used to replay the test procedure, the parameter "replay" of the initialization method is now set to "true." Then, the human behavior simulation module 314 retrieves the behavior list, which contains only the event that was previously saved from the server 316. Then, the test scripts 312 call a random method of the human behavior simulation module 314 with a retrieved behavior id and parameter. Then, the human behavior simulation module 314 records or logs the retrieved behavior id and parameter in the server 316. Then, the human behavior simulation module 314 executes the retrieved behavior on the mobile device 318. Then, the test scripts 312 execute the same test cases as before at the same time.

Figure 3C:
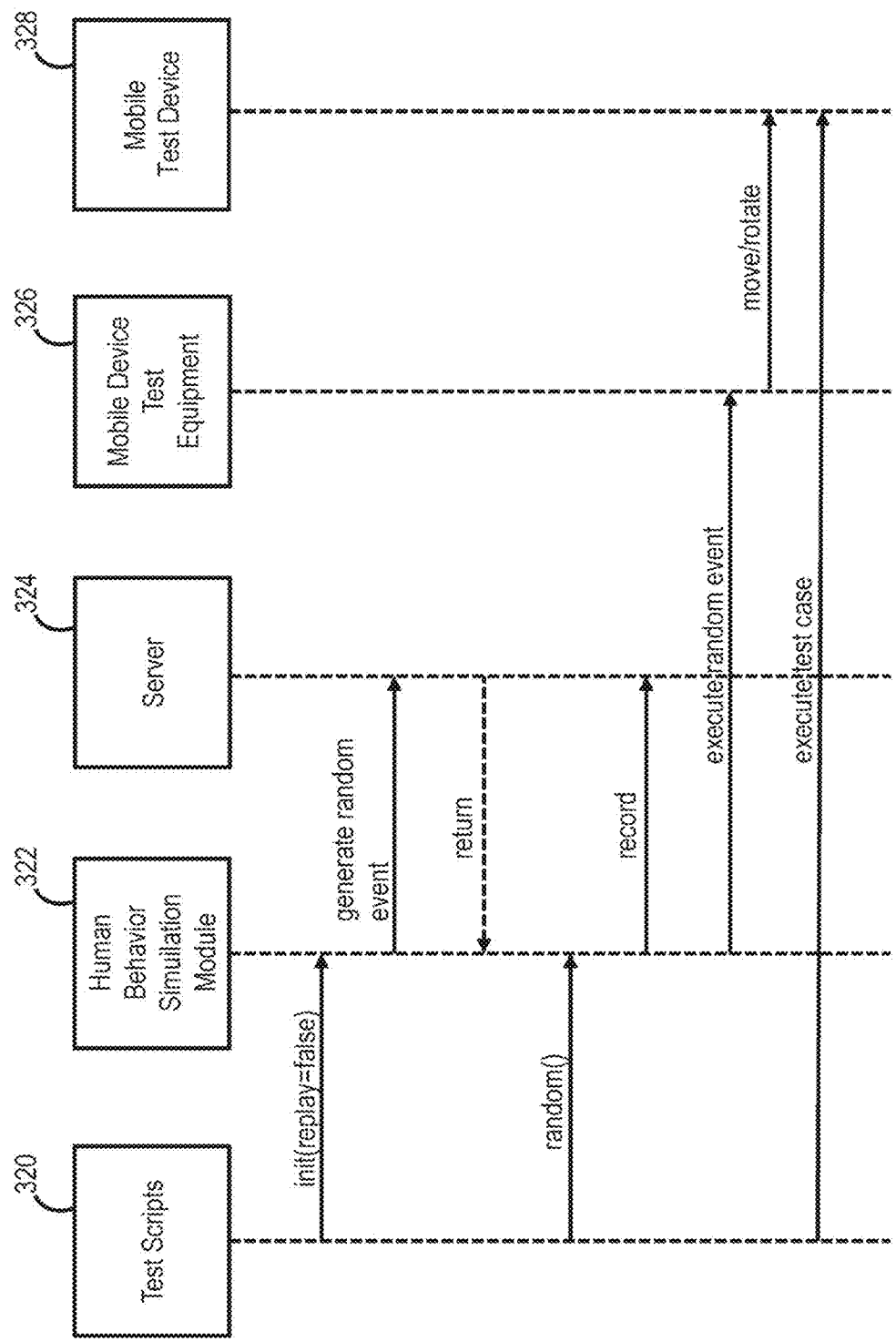

FIG. 3C shows a schematic flow diagram of a movement human-like behavior test procedure, according to an illustrative embodiment of the invention. This movement behavior (e.g., shifting and rotating mobile devices) is executed with auxiliary equipment. The test scripts 320 call an initialization method of the human behavior simulation module 322. As this procedure is used to test features and/or functions of mobile applications, rather than replay bugs, the parameter "replay" of the initialization method is set to "false." Then, the human behavior simulation module 322 retrieves a behavior list from the server 324. All pre-defined behaviors are saved in the server 324. As before, behaviors can be added to, updated in and deleted from the server 324. Then, the test scripts 320 chooses a behavior from the list randomly and then the human behavior simulation module 322 records it to the server 324 (including parameters associated with this event like shift distance and rotate degrees) and send commands to the mobile device test equipment 326 to drive (e.g., move, rotate or shift) the mobile devices 328. During the execution of selected event, test scripts 320 execute test cases on mobile device 328. If a bug has been tested out, the behavior can be retrieved and replayed. Then, the human behavior simulation module 322 sends commands to the mobile device test equipment 326, e.g., to shift or rotate the mobile device 328. Then, the test scripts 322 execute test cases at the same time on the mobile test device 328.

Figure 3D:
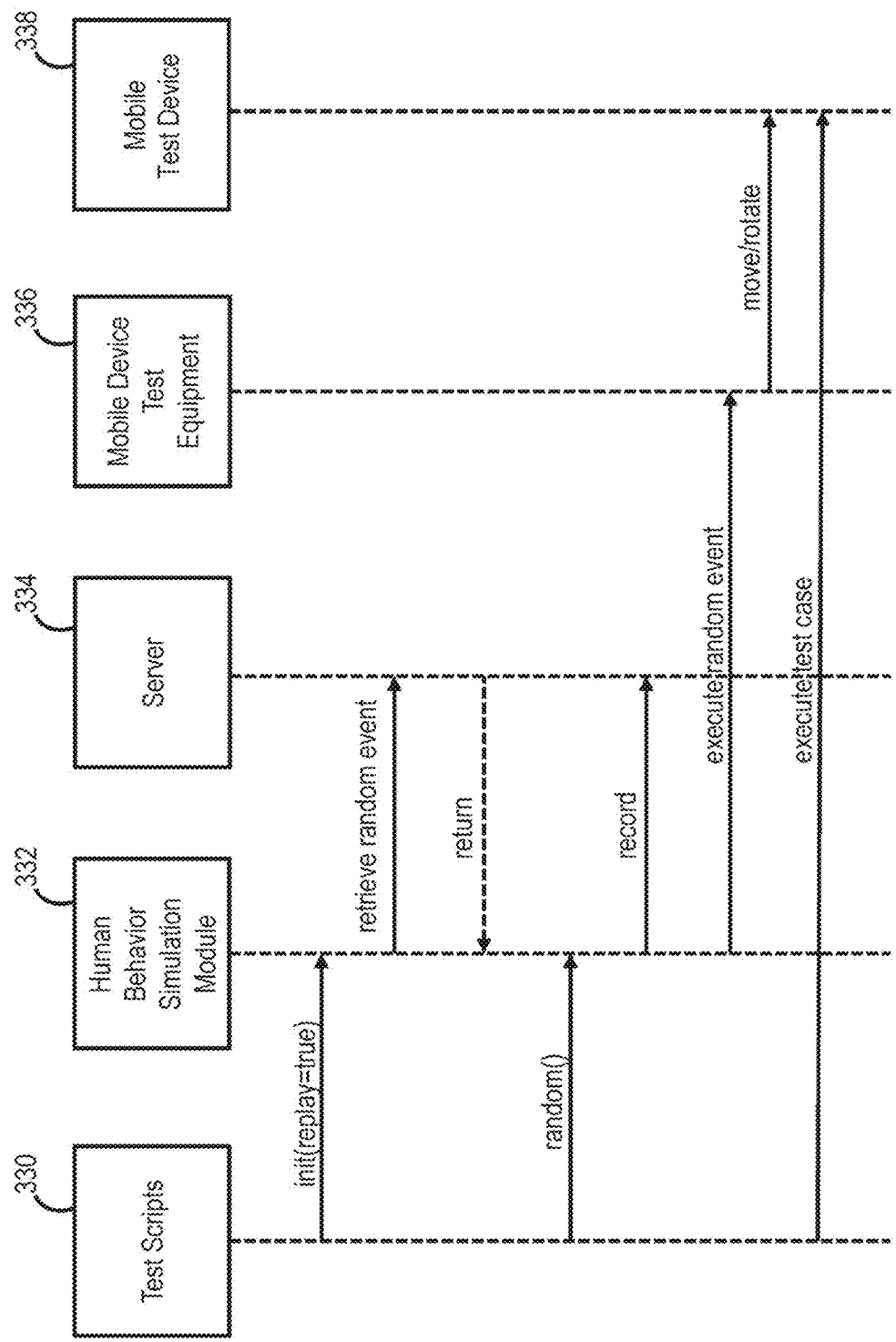

FIG. 3D shows a schematic flow diagram of a movement human-like behavior replay procedure, according to an illustrative embodiment of the invention. The test scripts 330 call the initialization method of the human behavior simulation module 332. As this procedure is used to replay the test procedure, the parameter replay of the initialization method is now set to "true." Then, the human behavior simulation module 332 retrieves the behavior list, which only contains the event that is saved before from the server 334. Then, the test scripts 330 call the random method of the human behavior simulation module 332 with a retrieved behavior id and parameter. Then, the human behavior simulation module 332 sends commands to the mobile device test equipment 336 to shift and rotate the mobile test device 338. Then, the test scripts 330 execute the same test cases as before at the same time. Using this approach, errors stemming from random human-like events can be tracked, further analyzed and resolved more effectively than in the past. With this solution, a bug tested out by normal automation testing could be reproduced for developers to fix.

Figure 3E:
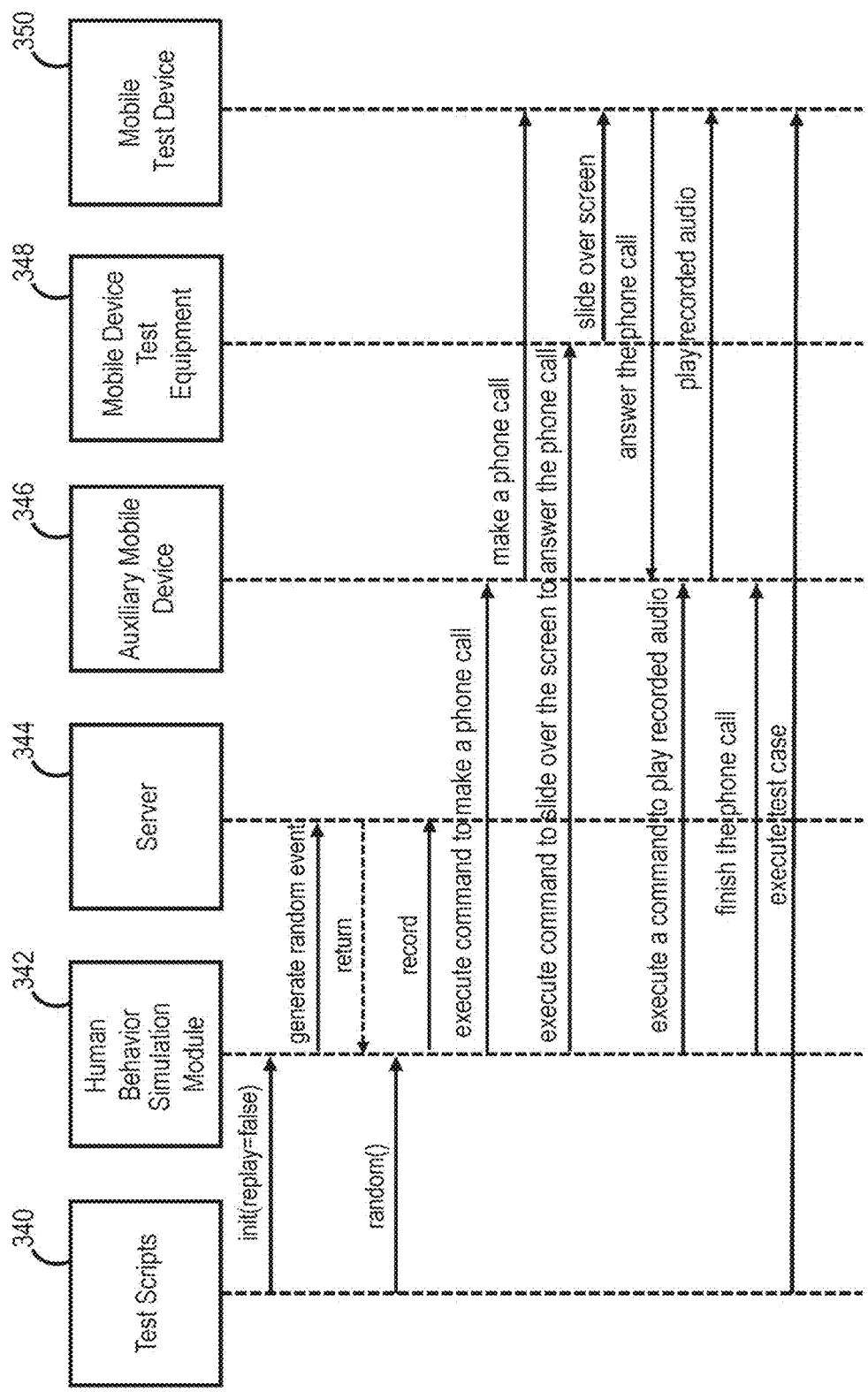

FIG. 3E shows a schematic flow diagram of taking a phone call, according to an illustrative embodiment of the invention. The test scripts 340 call an initial method of the human behavior simulation module 342. The human behavior simulation module 342 retrieves an event list from the server 344. The test scripts 340 obtain a human-like behavior from the list randomly and record it to the server 344. In this scenario, the random event generated is a phone call event. The human behavior simulation module 342 executes a command on the auxiliary mobile device 346 to make a phone call. The auxiliary mobile device 346 makes a phone call to the mobile test device 350. The human behavior simulation module 342 executes a command on the mobile device test equipment 348 test fixture to slide over the screen to answer the phone call. The mobile test device 350 answers the phone call. To simulate the phone call action, the human behavior simulation module 342 executes a command on the test device 350 to play recorded audio. When the test device 350 receives the command, the audio is played. The human behavior simulation module 342 finishes the phone call. The test scripts 340 execute test cases.

Thus, in this solution, a human behavior generator framework is used to simulate different kinds of human behaviors during mobile application testing. When test scripts are run, human-like behaviors are generated and executed at the same time. This procedure very closely mimics application usage in the real world. In addition, all generated human-like behaviors can be recorded in a database. When a bug is tested out, the records can be retrieved from the database, and the test scripts can be replayed to show how the bug was generated.

FIG. 4 is a flow chart showing a computerized method 400 of testing a mobile application, according to an illustrative embodiment of the invention. The method 400 includes a first step 405 of executing, by a computing device, a test script stored in memory of the computing device. The method 400 also includes a second step 410 of calling, by the computing device, according to the test script, a human behavior simulation module stored in memory of the computing device. The method 400 also includes a third step 415 of retrieving, by the computing device, via the human behavior simulation module, an event list stored in memory of a server, the server in electronic communication with the computing device, the event list including one or more electronic human behavior simulations. The method 400 also includes a fourth step 420 of receiving, by the computing device, via the human behavior simulation module, an electronic human behavior simulation from the event list. The method 400 also includes a fifth step 425 of providing, by the computing device, via the human behavior simulation module, selected data of the electronic human behavior simulation to memory of the server for recordation. The method 400 also includes a sixth step 430 of executing, by the computing device, via the human behavior simulation module, the electronic human behavior simulation on a mobile test device in electronic communication with the computing device. The method 400 also includes a seventh step 435 of executing, by the computing device, according to the test script, a test case stored in memory of the computing device on the mobile test device.

It should also be understood that various aspects and embodiments of the technology can be combined in various ways. Based on the teachings of this specification, a person of ordinary skill in the art can readily determine how to combine these various embodiments. In addition, modifications may occur to those skilled in the art upon reading the specification.

What is claimed is:

1. A computerized method of testing a mobile application stored in memory of a mobile test device, the computerized method comprising:
   executing, by a computing device, a test script stored in memory of the computing device;
   running, by the computing device, according to the test script, a human behavior simulation module stored in memory of the computing device;
   retrieving, by the computing device, via the human behavior simulation module, an event list stored in memory of a server, the server in electronic communication with the computing device, the event list including one or more electronic human behavior simulations;
   receiving, by the computing device, via the human behavior simulation module, an electronic human behavior simulation from the event list;
   providing, by the computing device, via the human behavior simulation module, selected data of the electronic human behavior simulation to memory of the server for recordation in a database, the selected data specifying simulation parameters external to the mobile test device's operation;
   executing, by the computing device, via the human behavior simulation module, the electronic human behavior simulation on a mobile test device in electronic communication with the computing device, the electronic human behavior simulation occurring externally to the mobile application's execution; and
   executing, by the computing device, according to the test script, a test case stored in memory of the computing device on the mobile test device,
   wherein the electronic human behavior simulation is received at a random time and includes at least one random action simulating a real-world interruption of the mobile application's execution based on an event that is external to the mobile test device's operation, and wherein such random action is recorded in the database and is retrievable and replayable for regenerating, in future mobile application tests, bugs uncovered during the mobile application's execution.

2. The method of claim 1 wherein the electronic human behavior simulation is generated based on a record of a previously run electronic human behavior simulation, the record stored in memory of the server and including at least one parameter of the previously run electronic human behavior simulation.

3. The method of claim 1 wherein executing the electronic human behavior simulation and executing the test case occur simultaneously or near-simultaneously.

4. The method of claim 1 wherein the electronic human behavior simulation simulates a human making a phone call.

5. The method of claim 1 wherein the electronic human behavior simulation simulates a human receiving a phone call.

6. The method of claim 1 wherein the electronic human behavior simulation simulates a human rotating or translating a mobile device.

7. The method of claim 1 wherein the electronic human behavior simulation simulates a human switching between mobile applications.

8. The method of claim 1 wherein the electronic human behavior simulation simulates a human rotating a mobile device such that a display screen of the mobile device changes orientation.

9. The method of claim 1 wherein the electronic human behavior simulation simulates changing a network connectivity status of a mobile device.

10. The method of claim 1 wherein the electronic human behavior simulation simulates receiving a push notification on a mobile device.

11. The method of claim 1 further including logging, by computing device, via a log module in communication with the human behavior simulation module, the selected data of the electronic human behavior simulation in a database of the server.

12. The method of claim 1 wherein executing the electronic human behavior simulation includes providing, via the human behavior simulation module, the electronic human behavior simulation to an event execution module.

13. The method of claim 12 wherein the event execution module is at least one of a command execution module, a notification module, or an internet-of-things module.

14. The method of claim 1 wherein executing the electronic human behavior simulation includes sending a command to mobile device test equipment in electronic communication with the computing device, the mobile device test equipment configured to interact with the mobile test device.

15. The method of claim 14 wherein the electronic human behavior simulation includes a physical movement implemented by auxiliary hardware in electronic communication with the mobile device test equipment.

16. The method of claim 14 wherein the mobile device test equipment includes a mobile device test fixture, the mobile device test fixture configured to rotate or translate the mobile test device or to interact with a screen of the mobile test device.

17. The method of claim 14 wherein the mobile device test equipment includes an auxiliary mobile phone used to make a phone call to the mobile test device.

18. The method of claim 1 wherein the electronic human behavior simulation includes providing a push notification to the mobile test device via a cloud messaging service in electronic communication with the mobile test device.

19. The method of claim 1 wherein the test script includes instructions specifying a time at which to run the human behavior simulation module.

20. The method of claim 1 wherein the electronic human behavior simulation simulates at least one of: (i) a human making a phone call; (ii) a human receiving a phone call;

(iii) a human rotating a mobile device; (iv) a human translating a mobile device; (v) a human switching between mobile applications; (vi) a human rotating a mobile device such that a display screen of the mobile device changes orientation; (vii) changing a network connectivity status of a mobile device; or (viii) receiving a push notification on a mobile device.

21. A system for testing a mobile application stored in memory of a mobile test device, the system comprising:
a computing device;
a server in electronic communication with the computing device; and
a mobile test device in communication with the computing device, the mobile test device configured to host a mobile application and execute mobile automation test scripts,
wherein the computing device is configured to (i) execute a test script stored in memory of the computing device; (ii) run, according to the test script, a human behavior simulation module stored in memory of the computing device; (iii) retrieve, via the human behavior simulation module, an event list including one or more electronic human behavior simulations; (iv) receive, via the human behavior simulation module, an electronic human behavior simulation from the event list; (v) provide, via the human behavior simulation module, selected data of the electronic human behavior simulation to memory of the server for recording, the selected data specifying simulation parameters external to the mobile test device's operation; (vi) execute, via the human behavior simulation module, the electronic human behavior simulation on a mobile test device in electronic communication with the computing device, the electronic human behavior simulation occurring externally to the mobile application's execution; and (vii) execute, according to the test script, a test case stored in memory of the computing device on the mobile test device;
wherein the electronic human behavior simulation is received at a random time and includes at least one random action simulating a real-world interruption of the mobile application's execution based on an event that is external to the mobile test device's operation, and wherein such random action is recorded in a database and is retrievable and replayable for regenerating, in future mobile application tests, bugs uncovered during the mobile application's execution.

22. The system of claim 21 further including a cloud messaging service in electronic communication with the computing device, the cloud messaging service configured to push notifications to the mobile test device.

23. The system of claim 21 further including mobile device test equipment in electronic communication with the computing device, the mobile device test equipment including at least one of a mobile device test fixture and an auxiliary mobile phone.

24. The system of claim 21 wherein the human behavior simulation module includes a human behavior generator, a log module, and at least one of a command execution module, a notification module, or an internet-of-things module.

25. The system of claim 21 wherein the electronic human behavior simulation simulates at least one of: (i) a human making a phone call; (ii) a human receiving a phone call; (iii) a human rotating a mobile device; (iv) a human translating a mobile device; (v) a human switching between mobile applications; (vi) a human rotating a mobile device such that a display screen of the mobile device changes orientation; (vii) changing a network connectivity status of a mobile device; or (viii) receiving a push notification on a mobile device.

26. A computerized method of testing a mobile application stored in memory of a mobile test device, the computerized method comprising:
executing, by a computing device, a test script stored in memory of the computing device;
running, by the computing device, according to the test script, a human behavior simulation module stored in memory of the computing device;
retrieving, by the computing device, via the human behavior simulation module, an event list stored in memory of a server, the server in electronic communication with the computing device, the event list including one or more electronic human behavior simulations;
receiving, by the computing device, via the human behavior simulation module, an electronic human behavior simulation from the event list;
providing, by the computing device, via the human behavior simulation module, selected data of the electronic human behavior simulation to memory of the server for recordation;
executing, by the computing device, via the human behavior simulation module, the electronic human behavior simulation on a mobile test device in electronic communication with the computing device; and
executing, by the computing device, according to the test script, a test case stored in memory of the computing device on the mobile test device,
wherein the electronic human behavior simulation (i) simulates receiving a push notification on a mobile device, or (ii) includes providing a push notification to the mobile test device via a cloud messaging service in electronic communication with the mobile test device.

27. A system for testing a mobile application stored in memory of a mobile test device, the system comprising:
a computing device;
a server in electronic communication with the computing device; and
a mobile test device in communication with the computing device, the mobile test device configured to host a mobile application and execute mobile automation test scripts,
wherein the computing device is configured to (i) execute a test script stored in memory of the computing device; (ii) run, according to the test script, a human behavior simulation module stored in memory of the computing device; (iii) retrieve, via the human behavior simulation module, an event list including one or more electronic human behavior simulations; (iv) receive, via the human behavior simulation module, an electronic human behavior simulation from the event list; (v) provide, via the human behavior simulation module, selected data of the electronic human behavior simulation to memory of the server for recording; (vi) execute, via the human behavior simulation module, the electronic human behavior simulation on a mobile test device in electronic communication with the computing device, the electronic human behavior simulation occurring externally to the mobile application's execution; and (vii) execute, according to the test script, a test case stored in memory of the computing device on the mobile test device;
wherein the electronic human behavior simulation is received at a random time and includes at least one random action simulating a real-world interruption of the mobile application's execution; and further including a cloud messaging service in electronic communication with the computing device, the cloud messaging service configured to push notifications to the mobile test device.

\* \* \* \* \*